Oct. 31, 1972   J. W. J. APPELDOORN ET AL   3,701,619
MIXING APPARATUS
Filed Oct. 23, 1970                           2 Sheets-Sheet 1
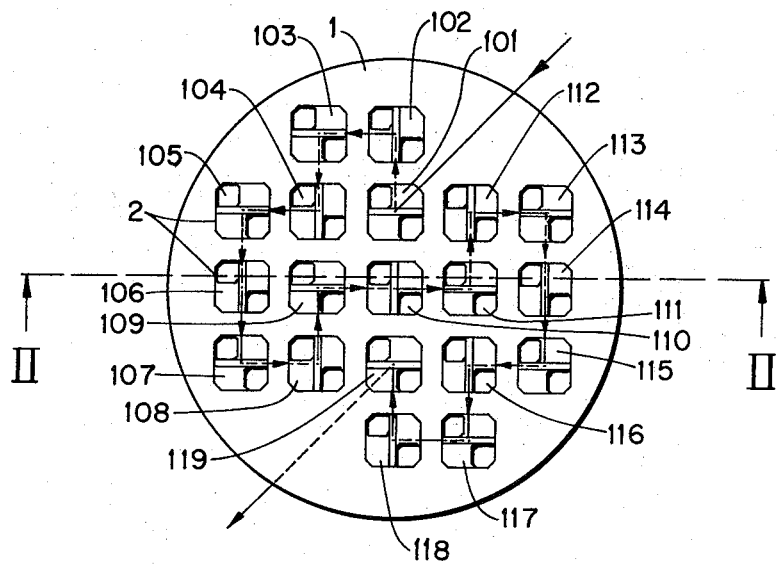
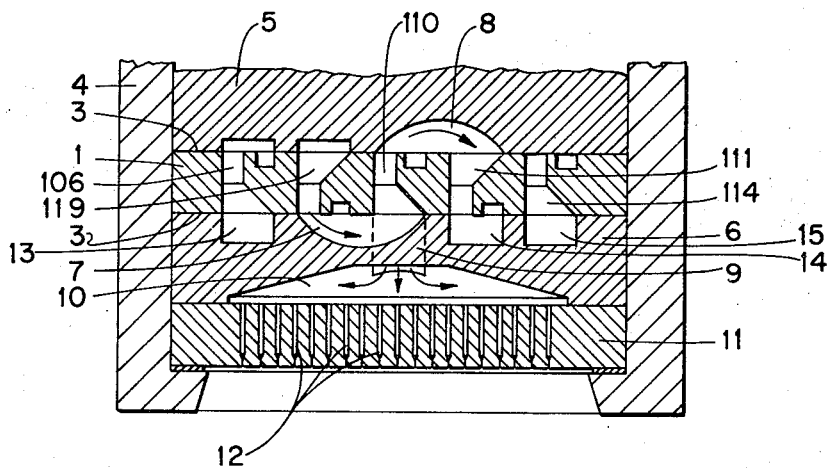
INVENTORS
JACQUES WILHELMUS JOZEF APPELDOORN
ROBERT SLUIJTERS
BY
Francis W. Young
ATTORNEY Oct. 31, 1972   J. W. J. APPELDOORN ET AL   3,701,619
MIXING APPARATUS
Filed Oct. 23, 1970   2 Sheets-Sheet 2

INVENTORS
JACQUES WILHELMUS JOZEF APPELDOORN
ROBERT SLUIJTERS
BY
*Francis W. Young*
ATTORNEY ยง
United States Patent Office 3,701,619
Patented Oct. 31, 1972

3,701,619
MIXING APPARATUS
Jacques W. J. Appeldoorn and Robert Sluijters, Arnhem, Netherlands, assignors to American Enka Corporation, Enka, N.C.
Filed Oct. 23, 1970, Ser. No. 83,402
Claims priority, application Netherlands, Nov. 14, 1969, 6917131
Int. Cl. B01f *15/02*
U.S. Cl. 425—198          3 Claims

ABSTRACT OF THE DISCLOSURE

An improved mixer with no moving parts is obtained by arranging mixing elements in side-by-side relationship. This apparatus, which is especially suitable for mixing one or more viscous liquids, includes a first body with substantially parallel end faces which contains a plurality of mixing elements with inlets and outlets arranged adjacent to each other in a common plane, the inlets and outlets of the adjacent mixing elements being located in the same face; a second body engaging one end face of the first body and having a passage for receiving one or more viscous liquids and directing the liquid to the inlet of an initial mixing element and channels for connecting the inlets and outlets of adjacent mixing elements in the end face in a pattern; and a third body engaging the other face of the first body and having channels for connecting the inlets and outlets of adjacent mixing elements in the other end face in a pattern, and a passage for discharging the viscous liquids from the exit of a final mixing element, the pattern of the channels being such as to guide the viscous liquids sequentially through each of the mixing elements to repeatedly divide and double the liquids whereby intensive mixing is obtained. This mixer is particularly suitable for use in an apparatus for melt spinning synthetic yarn wherein the first, second and third bodies are arranged so that the viscous liquids from the exit of a final element are directed to a spinneret plate.

---

This invention relates to a new use of the apparatus previously disclosed in U.S. Pats. Nos. 3,051,453 and 3,182,965. More particularly, this invention relates to apparatus for mixing or homogenizing one or more high-viscous liquids to effect heat transfer, cause a reaction, or divide the liquids into parallel layers.

An object of this invention is the combination of apparatus for mixing or homogenizing one or more liquids in an assemblage for melt spinning of synthetic yarn. Another object of this invention is to provide apparatus for mixing or homogenizing one or more liquids in a minimum height. Still another object of this invention is to provide apparatus of a minimum height for mixing or homogenizing one or more liquids in an assemblage for melt spinning synthetic yarn. Another object of this invention is to provide apparatus for use as a heat exchanger or as a reactor for carrying out chemical reactions.

A number of apparatus utilizing motionless blenders for imparting a close degree of blending to high viscous fluids are known, including those described in the above-mentioned patents. A common characteristic of these apparatus is the in-line combination of flow-diverting elements requiring a high length-to-width ratio of the combined elements. Certain processes, such as melt spinning of synthetic yarns, may extend for a height of several floors in a plant building. In such processes it is desirable to minimize the height requirements of each process step. It is also desirable when melt spinning synthetic yarn to have a high degree of homogeneity of the liquid polymer prior to spinning. It is evident the known apparatus, while adequate, would add substantially to the overall height of such a process. The present invention discloses a method of maintaining the close degree of controlled mixing of known apparatus in a minimum height.

The apparatus of the present invention comprises a multiplicity of mixing elements or liquid-guiding members as described in the above-mentioned patents in a given arrangement on the same plane, the central axis of each mixing element being parallel to other mixing elements. Interconnecting channels between outlets and inlets of the mixing elements permit sequential mixing in a minimum of height. One or more liquids from a given supply source is directed through a mixing element of the type with two or more substantially axial-flow channels, each of which successively converges and diverges. The resultant liquid is directed to an adjacent element inlet by an interconnecting channel.

A preferred embodiment of the apparatus according to the invention has only the first mixing element connected to a supply channel for receiving liquid and only the last mixing element connected to a liquid discharge channel. The mixing elements may be cast in a disc-shaped body. Interconnecting channels between the mixing elements may be located in adjacent discs contiguous to the central disc-shaped body.

According to the invention the number of mixing elements may be even or odd. Two or more discs may be mounted adjacent each other in such a manner that the outlet of a mixing element in the first disc is directly aligned with the inlet of a mixing element of the second disc.

The apparatus according to the invention permits the application of a large number of mixing elements in a minimum height, corresponding to the thickness of the disc. The number of guiding members will generally not be more than 30 and preferably between 15 and 25.

BRIEF DESCRIPTION OF THE DRAWINGS

FIG. 1 shows a disc with mixing elements in plan view;
FIG. 2 is a cross-sectional view of the disc of FIG. 1, installed in a spinning assembly.

In FIG. 1, there are nineteen mixing elements that are arranged side by side in the plane of disc 1 and at some distance from one another, the mixing elements generally being referred to by numeral 2. The mixing elements 2 each comprise two axial flow ducts, each of which successively converges and diverges in a plane turned through an angle of 90°, as described in U.S. Pat. No. 3,051,453. The longitudinal axis of each mixing element is perpendicular to the end faces 3 of disc 1. As can be seen from FIG. 2, disc 1 is installed between two other disc-shaped bodies 5 and 6 in a housing 4 of a partially shown melt spinning assembly. FIG. 2 shows discs 1, 5 and 6 in a cross section along line II—II of FIG. 1. In FIG. 1, the nineteen mixing elements 2 are numbered from 101 through 119 to indicate the sequence of flow. One or more molten polymers are supplied from above disc 5 to first mixing element 101. From the exit of 101 the liquid stream flows via a connecting channel in disc 6 to the inlet of mixing element 102. From the exit of 102 the liquid stream flows via another connecting channel in disc 5 to the inlet of mixing element 103. In this way the liquid successively passes through all the mixing elements 101 to 119. In FIG. 2 a cross-sectional view is shown of mixing elements 106, 109, 110, 111, and 114 and connecting channels 7, 8, 13, 14, and 15. Interconnecting channel 13, for example, connects mixing elements 106 and 107 as shown by flow arrows in FIG. 1. The stream of liquid passes in a downward direction through the last mixing element 119 to orient it through channel 9, shown by a broken line, into chamber 10 positioned over a spinneret plate 11. The spinneret plate contains a large number of orifices 12 shown by vertical lines.

Disc 1 may be cast in one piece from stainless steel by the lost wax casting process. The mixer obtained is compact and has a very intensive mixing action. Two unmixed liquid components supplied to the first mixing element are divided into two layers upon passage through that first mixing element. Through each successive mixing element the components are repeatedly divided and doubled so that, at the end of the nineteenth member, the number of layers of the two components is $2^{19}$, indicating a very intensive mixing of the two initially unmixed streams.

Figure 3:
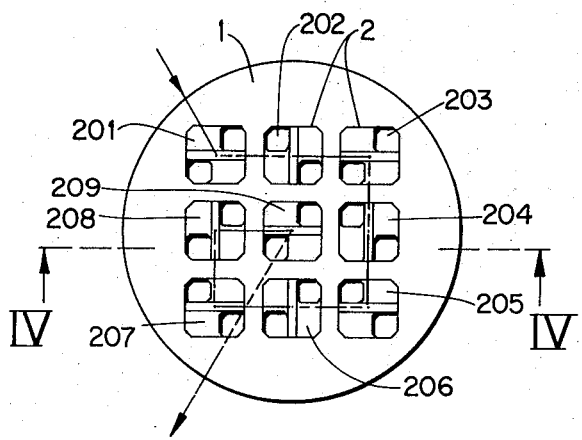
FIG. 3 is a plan view of two discs with mixing elements, one disc on top of the other.
Figure 4:
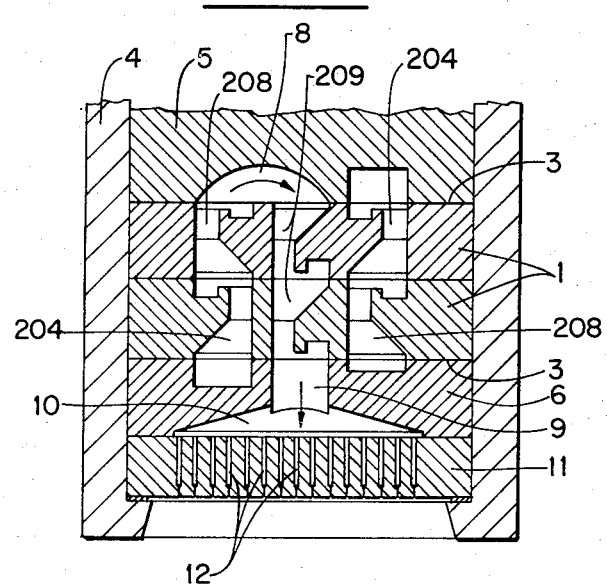
FIG. 4 is a cross-sectional view of the discs of FIG. 3, installed in a spinneret assembly.

A slightly different embodiment is shown in FIGS. 3 and 4. Two discs of identical construction are turned 180° relative to each other about their central axis in housing 4 of a spinning assembly. In each disc there are nine mixing elements 201 through 209.

Figure 5:
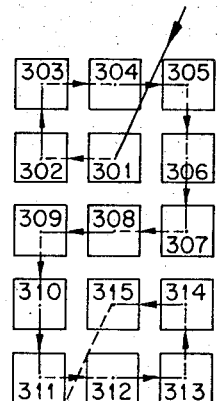
FIGS. 5 and 6 represent block diagrams of discs with different groups of mixing elements.
Figure 6:
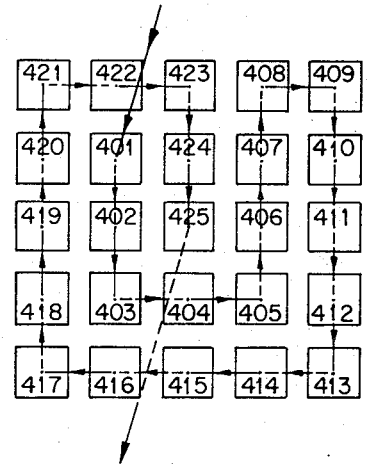

FIGS. 5 and 6 are schemes for the application of mixing elements in groups of 15 and 25. At the top and bottom sides of the discs the connecting channels between successive mixing elements are shown by full and broken lines respectively. The scheme according to FIG. 5 is particularly suitable for application in melt spinning assemblies comprising a rectangular spinneret plate.

What is claimed is:
1. Apparatus for melt spinning synthetic yarn comprising:
   (a) a melt spinning assembly housing with a central spinning axis and spinneret plate having orifices for spinning synthetic yarn;
   (b) a first body mounted in the spinning assembly housing and having two substantially parallel end faces perpendicular to said spinning axis, said first body containing a plurality of mixing elements with inlets and outlets arranged adjacent each other in a common plane of said first body with the inlets and outlets of adjacent mixing elements being located in the same face, said mixing elements having two or more substantially axial flow ducts, each of which converges and diverges to divide the viscous liquids into layers;
   (c) a second body mounted in the spinning assembly housing and cooperatively engaging one end face of the first body, said second body having therein a passage for receiving and directing one or more viscous liquids to the inlet of an initial mixing element, and channels for connecting the inlets and outlets of adjacent mixing elements in the one end face in a pattern; and
   (d) a third body mounted in the spinning assembly housing and cooperatively engaging the other end face of the first body, said third body having therein channels for connecting the inlets and outlets of adjacent mixing elements in the other end face in a pattern, and a passage means for directing the viscous liquids from the exit of a final mixing element to the spinneret plate, the pattern of channels being to guide the viscous liquids sequentially through each of the mixing elements to repeatedly divide and double the liquids to provide intensive mixing.

2. The apparatus of claim 1 wherein the number of mixing elements is not more than 30.

3. The apparatus of claim 1 wherein the number of mixing elements is between 15 and 25.

References Cited
UNITED STATES PATENTS

| | | | |
|---|---|---|---|
| 3,051,452 | 8/1962 | Nobel | 259—4 |
| 3,051,453 | 8/1962 | Sluijters | 259—4 |
| 3,130,448 | 4/1964 | Tomlinson | 18—8 |
| 3,195,865 | 7/1965 | Harder | 259—4 |

ROBERT W. JENKINS, Primary Examiner

U.S. Cl. X.R.

259—4

UNITED STATES PATENT OFFICE
CERTIFICATE OF CORRECTION

Patent No. 3,701,619      Dated October 31, 1972

Inventor(s) Jacques W. J. Appeldoorn and Robert Sluijters

It is certified that error appears in the above-identified patent and that said Letters Patent are hereby corrected as shown below:

Column 1, line 4, which now reads:

"Netherlands, assignors to American Enka Corporation,"

Should read:

--Netherlands, assignors to Akzona Incorporated --

Signed and sealed this 5th day of November 1974.

(SEAL)
Attest:

McCOY M. GIBSON JR.
Attesting Officer

C. MARSHALL DANN
Commissioner of Patents